United States Patent
Osamura et al.

(10) Patent No.: US 7,243,567 B2
(45) Date of Patent: Jul. 17, 2007

(54) OPERATING POSITION SELECT DEVICE FOR AUTOMATIC TRANSMISSION

(75) Inventors: Kensuke Osamura, Tokyo (JP); Yukitsugu Hirota, Tokyo (JP); Yuzo Shimamura, Tokyo (JP); Masaharu Nagano, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 273 days.

(21) Appl. No.: 11/050,795

(22) Filed: Feb. 7, 2005

(65) Prior Publication Data

US 2005/0176555 A1    Aug. 11, 2005

(30) Foreign Application Priority Data

Feb. 9, 2004    (JP) ............................ 2004-032547

(51) Int. Cl.
| | |
|---|---|
| F16H 59/00 | (2006.01) |
| F16H 59/30 | (2006.01) |
| F16H 61/16 | (2006.01) |
| B60K 20/00 | (2006.01) |

(52) U.S. Cl. ...................... 74/335; 74/473.1; 477/122; 477/125

(58) Field of Classification Search ................ 477/122, 477/123, 131, 125, 99; 74/335, 473.1, 473.12, 74/473.15, 473.21, 473.24

See application file for complete search history.

(56) References Cited

U.S. PATENT DOCUMENTS

| | | | |
|---|---|---|---|
| 4,980,668 A | 12/1990 | Leigh-Monstevens | |
| 6,196,078 B1 | 3/2001 | DeJonge et al. | |
| 6,637,281 B2 * | 10/2003 | Yamamoto | 74/335 |
| 2004/0123693 A1 * | 7/2004 | Ogasawara et al. | 74/473.1 |
| 2004/0139815 A1 * | 7/2004 | Shimamura et al. | 74/335 |

FOREIGN PATENT DOCUMENTS

| | | | |
|---|---|---|---|
| EP | 0872670 A2 * | 10/1998 | |
| EP | 1 191 260 A2 | 3/2002 | |
| EP | 1 335 155 A2 | 8/2003 | |
| EP | 1433986 A1 * | 6/2004 | |
| GB | 2 315 305 A | 1/1998 | |
| JP | 9-323559 A | 12/1997 | |
| JP | 2003-97694 A | 4/2003 | |
| JP | 2003-287126 | * 10/2003 | |

* cited by examiner

Primary Examiner—Roger Pang
(74) Attorney, Agent, or Firm—Foley & Lardner LLP

(57) ABSTRACT

An operating position select device has a select lever unit, a mode shift unit to shift operation modes of the automatic transmission, a mechanically connecting means connecting them, and an assist actuator to apply assist force to a select lever of the select lever unit. A control unit for controlling the actuator is electrically connected to an operating state sensor detecting an operating state of the select lever. The control unit executes assist control to control the assist actuator based on the operating state signal of the operating state sensor, and maintains the assist control for a predetermined period after the ignition switch is turned to OFF.

13 Claims, 13 Drawing Sheets

OPERATING POSITION SELECT DEVICE FOR AUTOMATIC TRANSMISSION

BACKGROUND OF THE INVENTION

1. Field of the Invention

The present invention relates to an operating position select device for an automatic transmission by which a driver can select by operating a select lever one of select mode positions corresponding to a plurality of operation modes of the automatic transmission.

2. Description of the Related Art

An operating position select device for an automatic transmission of this kind is disclosed in Japanese patent laying-open publication No. 9-323559. This select device includes a select lever unit disposed near a driver's seat in a passenger compartment and a mode shift unit mounted on an automatic transmission. The select lever unit has a select lever manually operated by a driver and is connected with the mode shift unit by a connecting mechanism, such as a control cable, or a connecting linkage, which transmits an operating force applied on the select lever by the driver to the mode shift unit to shift operation modes of the automatic transmission.

The conventional art, however, has a problem that the select lever unit needs a long select lever in order to operate it without a large operating force of the driver, which reduces design freedom concerning an installation location of the select lever unit and/or a layout of a passenger compartment.

This reason comes from the fact that a length of the select lever is determined so that a driver can easily operate the select lever and its operating torque must overcome frictional resistance of the connecting mechanism and the like. Namely, the operating torque, generated by the operating force on the select lever, has to be larger than torque caused by the sum of the frictional resistance in the connecting mechanism and resistance generated when a detent pin, which moves with the select lever, gets over a cam top portion of a detent plate during select operation, although the operating force of the driver is limited to a certain extent. Accordingly, to satisfy both of the above requirements the select lever needs to be longer than a certain length, typically to be 350 mm.

Another operating position select device for an automatic transmission of this kind is disclosed in Japanese patent laying-open publication No. 2003-97694. This select device is, what is called, a shift-by-wire type one. It has a select lever manually operated by a driver, a select position detector for detecting a position of the select lever, a mode shift unit mounted on an automatic transmission for shifting its operation modes, an electric motor for driving a mode shift unit, and a control unit for controlling the electric motor based on an output signal from the detector.

This select device is suitable for shortening a length of the select lever and expanding design freedom for its installation location and/or layout of a passenger compartment, while the select device lacks a mechanical connection between the select lever and the mode shift unit. This lack of the mechanical connection results in a problem that the mode shift unit can not be sifted despite of operating the select lever in case of electrical failure such that an electric wire is broken, or the select position detector or the control unit fails.

It is, therefore, an object of the present invention to provide an operating position select device for an automatic transmission which overcomes the foregoing drawbacks and can expand design freedom concerning layout of a passenger compartment and/or an installation location of a select lever unit, and drive a mode shift unit despite of electric failure of the operating position select device, and obtain a select operation characteristic to fulfill the requirement.

SUMMARY OF THE INVENTION

According to the first aspect of the present invention there is provided an operating position select device for an automatic transmission comprising: a select lever unit having a select lever that is operated by a driver between a plurality of select positions corresponding to the operation modes; an operating state sensor that detects an operating state of the select lever and outputs an operating state signal; a mode shift unit mounted on the automatic transmission to shift operation modes of the automatic transmission; a mechanically connecting means that mechanically connects the select lever and the mode shift unit with each other; an assist actuator that is arranged between the select lever and the mode shift unit and supplies assist force to the shift lever; and a control unit for executing assist control to control the assist actuator based on the operating state signal, and the control unit having an assist maintenance part for maintaining the assist control for a predetermined period after an ignition switch signal of an ignition switch of an engine becomes OFF.

Therefore, the operating position select device can expand design freedom concerning layout of a passenger compartment and/or an installation location of a select lever unit, and drive a mode shift unit despite of electric failure of the operating position select device, and obtain a select operation characteristic to fulfill the requirement.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
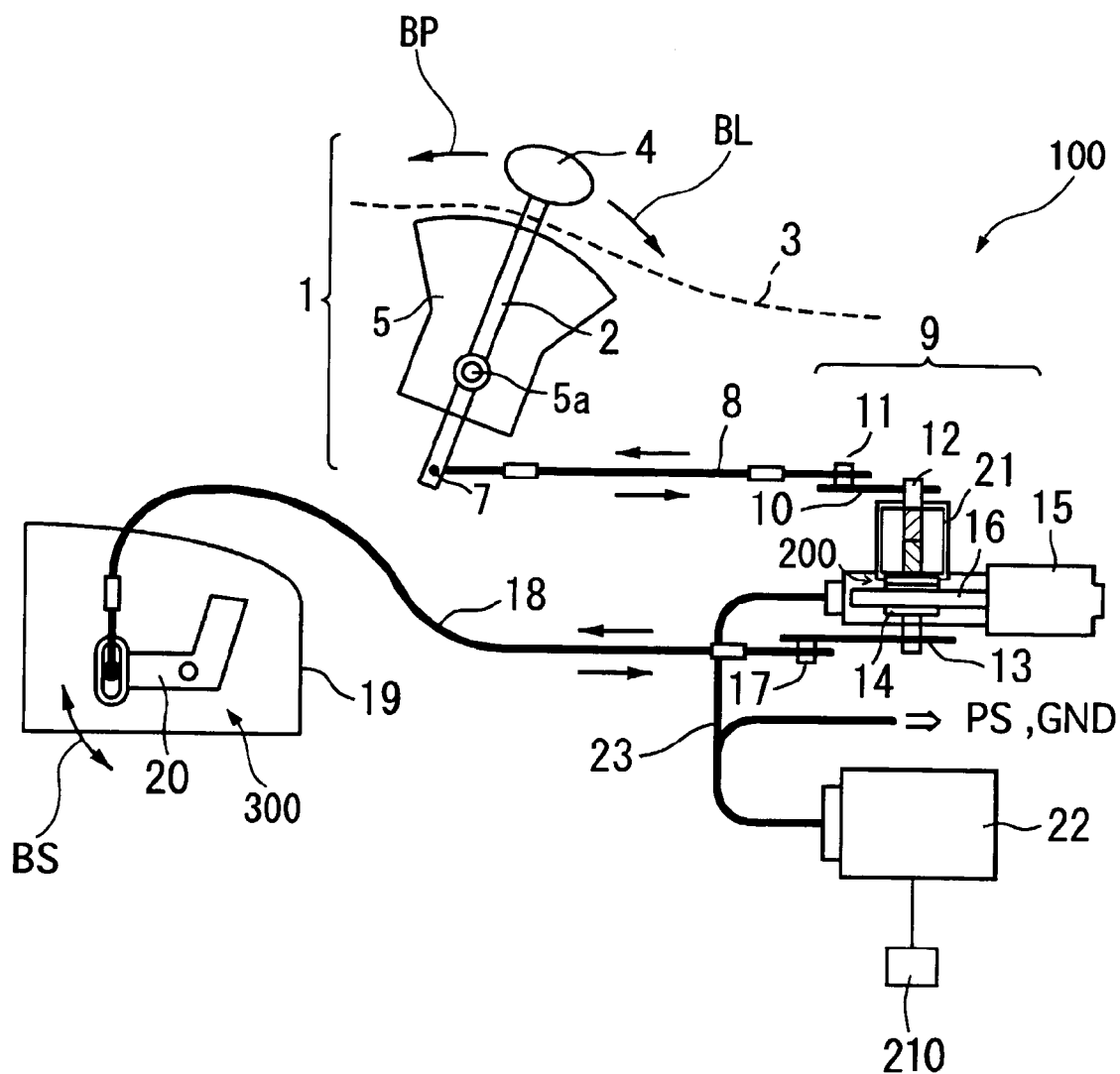
FIG. 1 is a schematic diagram showing a structure of an automatic transmission with an operating position select device of a preferred first embodiment according to the present invention.

Throughout the following detailed description, similar reference characters and numbers refer to similar elements in all figures of the drawings, and their descriptions are omitted for eliminating duplication.

An operating position select device of a first preferred embodiment according to the present invention will be described with reference to the accompanying drawings.

Referring to FIG. 1 of the drawing, there is shown an automatic transmission 19 and an operating position select device 100 to control the transmission 19.

The automatic transmission 19 is a conventional multispeed transmission with a plurality of planetary gear sets, not shown, and operated among a plurality of operation modes, for example, a parking mode, a reverse drive mode, a neutral mode, a forward drive mode, and a forward low gear drive mode.

The automatic transmission 19 is provided with the operating position select device 100, which shifts the operation modes to a desirable operation mode by manually selecting a select lever 2 of the select device 100.

The operating position select device 100 includes a select lever unit 1 manually operated by a driver, an operating angle sensor 200 for detecting an operating angle of the select lever 2, an mode shift unit 300 mounted on the automatic transmission 19, a first and second control cables 8 and 18 connecting the select lever 2 to the mode shift unit 300, an assist actuator 9 for assisting operating force inputted to the select lever 2 by the driver, a torque sensor 21 for detecting operating torque applied to the select lever 2, and a control unit 22 for controlling the assist actuator 9.

Figure 3:
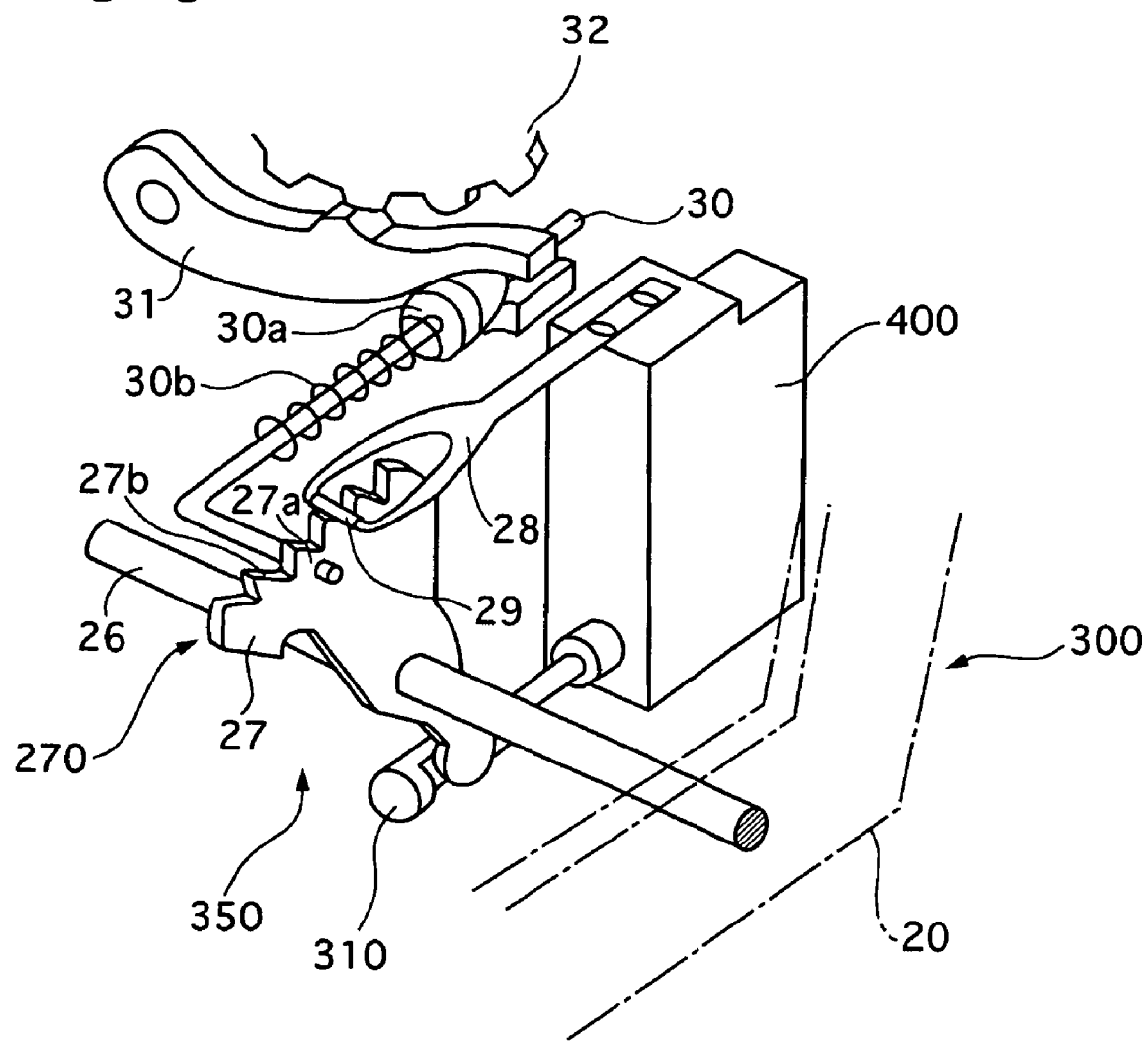
FIG. 3 is an enlarged perspective view showing a mode shift unit with a detent mechanism that is used in the operating position select device shown in FIG. 1.

The select lever unit 1 is arranged, for example, at a center console 3 beside a driver's seat and has the select lever 2 operated by the driver, a bracket 5 fixed to a vehicle body, a supporting shaft 5a fixed on the bracket 5 so as to swingably support the select lever 2, a knob 4 that is mounted on the top of the select lever 2 so as to be held by a hand of the driver, and a checking mechanism 270, shown in FIG. 3, for ensuring the select lever 2 to be kept in a selected mode position.

The select lever 2 is set to be about 100 mm in length in this embodiment, which is shorter by about 250 mm than a conventional type select lever. The lever 2 is operatable by the driver swingably in a first direction toward a P position as indicated by an arrow $B_P$ and a second direction, opposite to the first direction, toward an L position as indicated by an arrow $B_L$.

The select lever 2 can be located in one of select positions: the P position corresponding to the parking mode of the automatic transmission 19, an R position corresponding to the reverse drive mode, an N position corresponding to the neutral mode, a D position corresponding to the forward drive mode, and the L position corresponding to the forward low geared drive mode.

Figure 2:
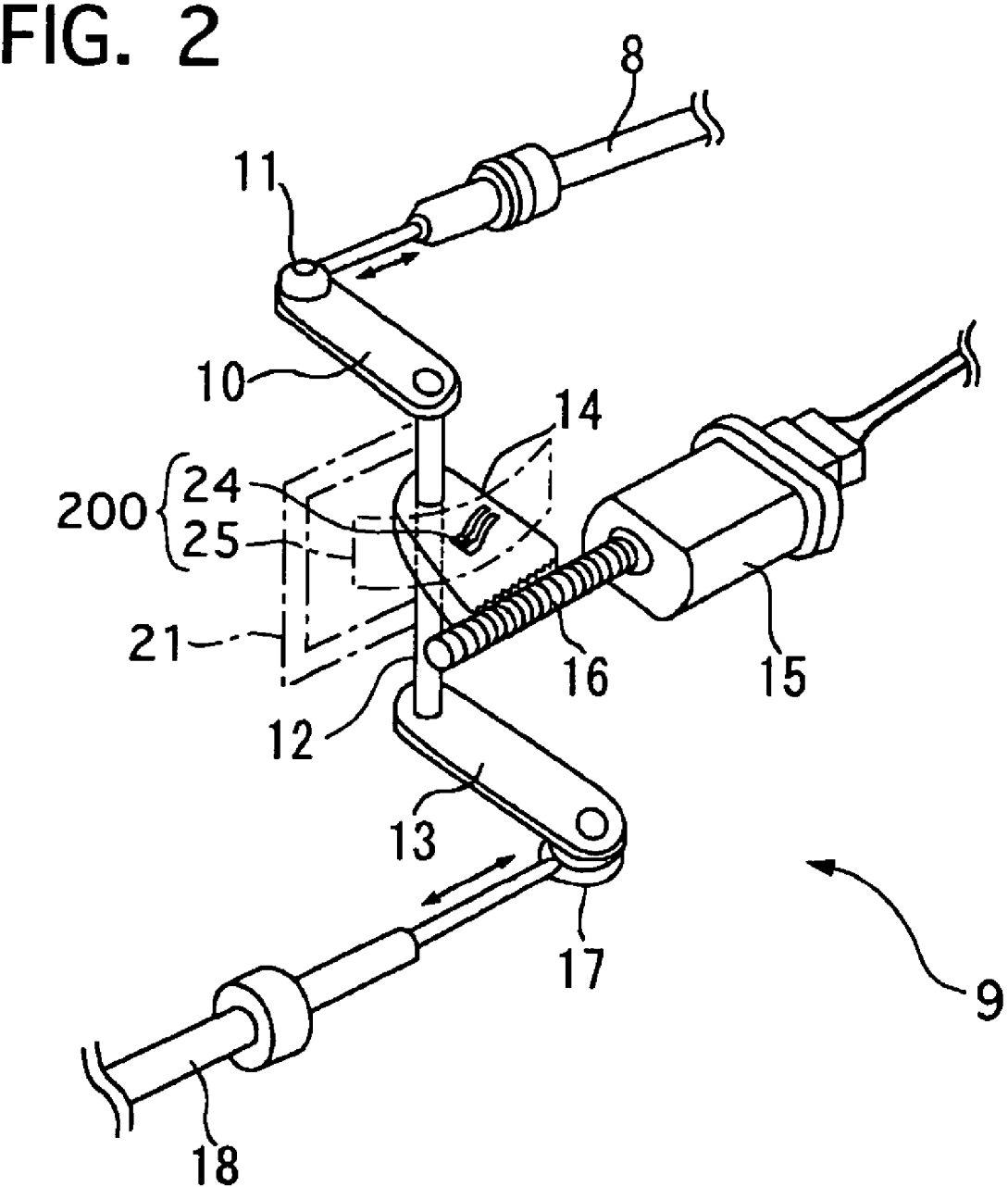
FIG. 2 is an enlarged perspective view showing an assist actuator that is used in the operating position select device shown in FIG. 1.

The assist actuator 9, as shown in FIGS. 1 and 2, includes an electric motor 15 with reduction gears reducing rotation speed of an output shaft of the motor 15, a worm 16 that is formed on the outer peripheral surface of the output shaft, and a worm wheel 14 that is in mesh with the worm 16 and integrally united to the coupling shaft 12 coupling the first and second control cables 8 and 18 through an input and output levers 10 and 13, respectively.

The worm wheel 14 is provided on its upper surface with an electric terminal 24 contacting to a carbon resistor 25, indicated by a dashed line in FIG. 2, that is printed on a substrate fixed to a case of the assist actuator 9. The electric terminal 24 and the carbon resistor 25 constitute the operating angle sensor 200 for detecting an operating angle of the select lever 2 to output an operating angle signal to the control unit 22.

The electric terminal 24 is movable together with and around the coupling shaft 12 to change its position with respect to the carbon resistor 25 that is immobile and detects a rotating angle of the coupling shaft 12 for outputting the operating angle signal. The operating angle signal is, for example, proportional to the operating angle of the select lever 2, both of which increase as the select lever 2 moves toward the L position, in the second direction $B_L$. The operating angle sensor 200 corresponds to an operating state sensor of the present invention, and the operating angle signal corresponds to an operating state signal of the present invention.

There is provided the torque sensor 21 attached to the coupling shaft 12 so as to detect the operating torque applied to the coupling shaft 12, which is proportional to operating force applied to the shift lever 2. The torque sensor 21 detects the operating torque based on relative torsion between the upper and lower portions of the coupling shaft 12 and outputs an operating torque signal to the control unit 22. The operating torque signal, for example, increases with the operating force applied to the select lever 2. The torque sensor 21 corresponds to the operating state sensor of the present invention, and the operation force signal corresponds to the operating state signal of the present invention.

The mode shift unit 300 shifts the operation modes of the automatic transmission 19 according to an operated position of the select lever 2. Referring to FIGS. 1 and 3 of the drawings, the mode shift unit 300 has a manual plate lever 20 and a detent mechanism 350 for keeping the manual plate lever 20 in a position selected by the select lever 2.

The manual plate lever 20 is integrally fixed in its intermediate portion with a rotary shaft 26, and connected at its one end portion with the second control cable 18 so as to be rotated on the shaft 26 with respect to a case of the transmission 19 according to select operation of the select lever 2. The rotary shaft 26 is fixed to a detent plate 27 of the detent mechanism 350.

The detent mechanism 350 includes the detent plate 27 with a cam 270, a detent pin 29 to be pressed onto the cam 270, and a spring plate 28 acting its spring force on the detent pin 29.

The detent plate 27 is mechanically connected with a valve spool 310 of a manual valve disposed in a control valve unit 400 of the automatic transmission 19 so as to move the spool 300 according to a select position. The detent plate 27 is formed on its upper portion with the cam 270 having top portions 27a and bottom portions 27b. Each bottom portion 27b is arranged between the adjacent top portions 27a and corresponds with one of the five operation modes of the automatic transmission 19.

The cam 270 is pressed by the detent pin 29 that is urged by the spring plate 28. The spring plate 28 is mounted at its one end portion on the control valve unit 400 and supports the detent pin 29 at its other end portion. The spring plate 28 presses the detent pin 29 onto the cam 270 of the detent plate 27 so that the detent pin 29 is positioned in one of the bottom portions 27b to detain the valve spool 310 of the manual valve in the selected position.

The detent plate 27 is coupled at its cam side portion with a parking rod 30 having a wedge 30a that can press a parking pawl 31. The wedge 30a is movable along the rod 30 and presses the parking pawl 31 by spring force of a coil spring 30b so that the pawl 31 engages with a parking wheel 32 united to an output shaft of the automatic transmission 19 when the select lever 2 is shifted to the P position. This engagement of the pawl 31 and the wheel 32 results in locking drive wheels, not shown, for parking a motor vehicle.

The mode shift unit 300 is mechanically connected with the select lever 2 through the first and second control cables 8 and 18, and others. As shown in FIGS. 1 and 2, the first control cable 8 connects at its one end portion with a bottom portion of the select lever 2 through a first joint 7 and at the other end portion with one end portion of the input lever 10 through a second joint 11. The other end portion of the input lever 10 is connected with a top portion of a coupling shaft 12, whose bottom portion is connected with one end portion of the output lever 13. The other end portion of the output lever 13 is connected with one end portion of the second control cable 18 through a third joint 17. The other end portion of the second control cable 18 is, as shown in FIGS. 1 and 3, connected with the manual plate lever 20.

The first and second control cables 8 and 18, the first to third joints 7, 11, and 17, the input and output plates 10 and 13, and the coupling shaft 12 corresponds to a mechanically connecting means of the present invention.

The control unit 22 is electrically connected to a power supply PS, ground GND, an ignition switch 210 for starting or stopping a not-shown engine, the operating angle sensor 200, and the torque sensor 21. The control unit 22 receives the operating angle signal from the operating angle sensor 200, the operating torque signal from the torque sensor 21, and an ignition switch signal from the ignition switch 210 to compute target assist current based on these signals, and drives the electric motor 15 under pulse width modulation (PWM) control based on the target assist current.

Figure 4:
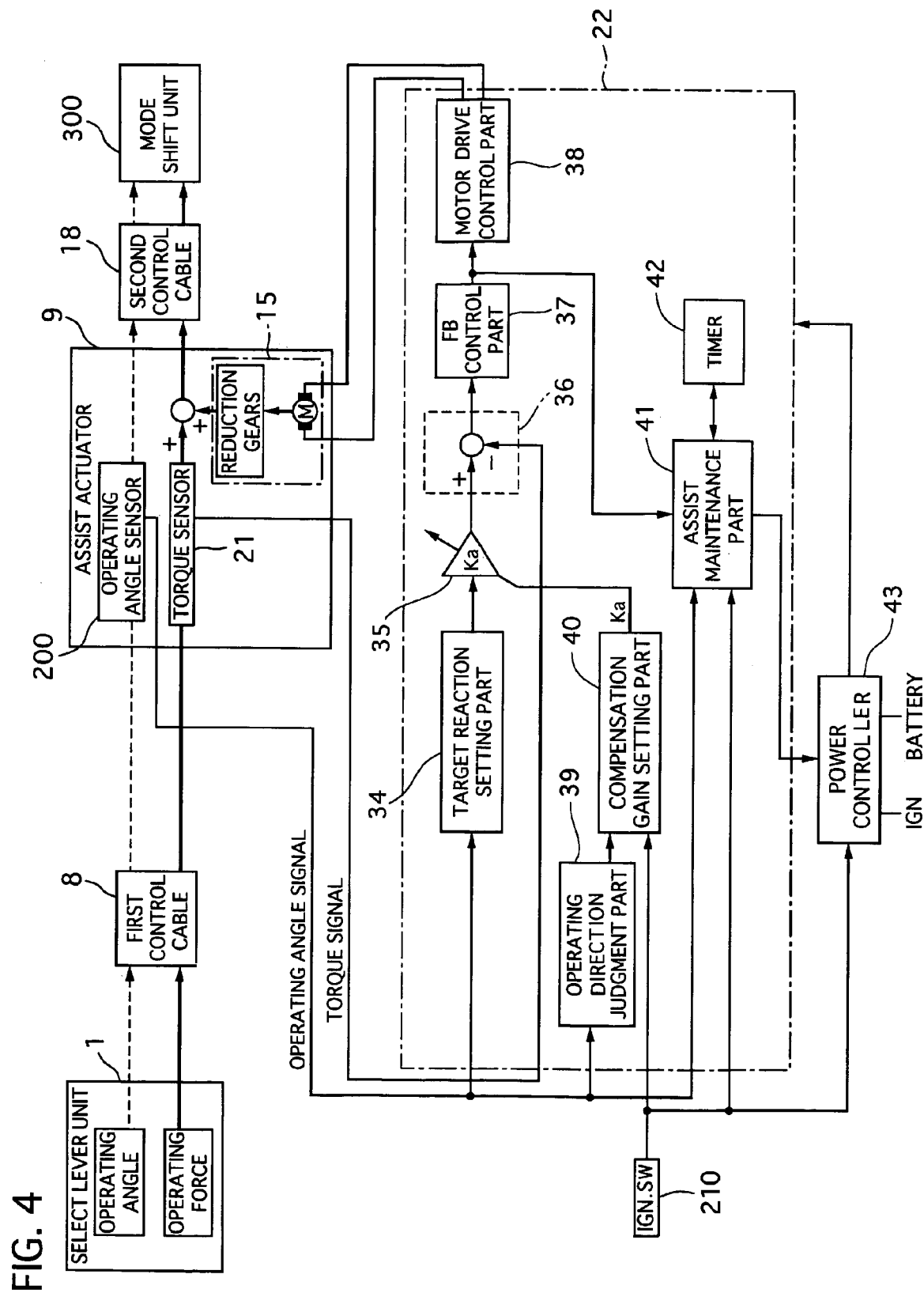
FIG. 4 is a control bock diagram of a control unit and its peripheral equipment that are used in the operating position select device shown in FIG. 1.

FIG. 4 shows a control block diagram of the control unit 22 and its related units. When the select lever 2 is shifted by a driver, the select lever 2 moves and changes its operating angle, and operating force applied to the lever 2 by the driver is transmitted to the mode sift unit 300 through the first and second control cables 8 and 18, and the coupling shaft 12.

The first control cable 8 rotates the coupling shaft 12, so that the terminal 24 on the worm wheel 14 united with the shaft 12 moves with respect to the carbon resistance 25 to change a relative angle between them. This relative angle, corresponding to an operating angle of the select lever 2, is detected by the operating angle sensor 200, which outputs an operating angle signal to the control unit 22.

Operating force applied to the select lever 2 is transmitted through the first control cable 8 to the coupling shaft 12 and twists it, so that torsion occurs between the upper and lower portions of the shaft 12. This torsion is detected by the torque sensor 21, which outputs an operating torque signal to the control unit 22.

The control unit 22 includes a target reaction setting part 34, a multiplier 35, an adder 36, a feedback control part 37, a motor drive control part 38, an operating judgment part 39, a compensation gain setting part 40, an assist maintenance part 41, and a timer 42. The compensation gain setting part 40, multiplier 35, and the compensation gain setting part 40 act as an assist suppression part of the present invention.

The target reaction setting part 34 sets target reaction force Ft based on an operating angle signal outputted from the operating angle sensor 200 by using a data table, not shown, and outputs a reaction torque signal, proportional to the target reaction force Ft, to the multiplier 35.

The multiplier 35 multiplies the reaction torque signal by a compensation gain Ka obtained from the compensation gain setting part 40, and outputs its compensated reaction torque signal to the adder 36. The multiplier 35, the compensation gain setting part 40, and the operating direction judgment part 39 act as an assist suppression part of the present invention.

The adder 36 computes a difference between torque obtained from the torque sensor 21 from the reaction torque obtained from the multiplier 35 by their subtraction.

The feedback (hereinafter referred to as "FB") control part 37 outputs an assist control signal based on the difference to the assist maintenance part 41 so as to control the assist force according to the torque difference.

The operating direction judgment part 39 judges based on the operating angle signal an operating direction of the select lever 2 and outputs an operating direction signal. This operating direction signal includes information on whether or not the select lever 2 is operated in a direction where the select lever 2 moves toward the P position.

The compensation gain setting part control part 40 compensates a gain Ka based on the operating direction signal and the ignition switch signal. The gain Ka is changed and outputted to the multiplier 35 so that the target reaction force Ft becomes equal to or close to reaction force applied from the detent mechanism 350 when the ignition switch signal is OFF and operating direction is the direction where the select lever 2 moves away from the P position.

The assist maintenance part 41 outputs an assist maintenance signal to the power controller 43 so that the assist control is maintained for a predetermined period after the ignition switch becomes OFF. At a time, the timer 42 starts to count an elapse time so as to maintain the assist control for the predetermined period. The predetermined period is set to have a period so sufficiently long that a driver can re-select a select lever to the P position after the driver notices that his or her ignition key can not be taken out of an instrument panel or key-lock is not established, for example, 10 seconds to one minute in this embodiment.

Further, the assist maintenance part 41 controls the assist maintenance signal to be stopped when the select lever 2 is judged to be in the P position by using the operating angle signal. Still further, when an assist control amount exceeds a predetermined control amount after the predetermined period, the assist control is maintained until the assist control amount becomes equal to or less than the predetermined control amount.

The timer 42 counts elapse time when the assist maintenance part 41 outputs a demand signal to the timer 42.

The power controller 43 controls an ignition power line to a battery power line based on the demand signal outputted from the assist maintenance part 41 so as to supply electric power to the control unit 22 so as to perform the assist control after the ignition switch signal becomes OFF. The power controller 43, the timer 42, and the assist maintenance part 41 act as an assist stop control part of the present invention.

The motor drive control part 38 receives the motor assist current signal from the FB control part 37 and outputs motor drive current determined based on these signals to the electric motor 15 under Power Width Modulation (PWM) control. In stead of the PMW control, the motor 15 may be driven under other controls, such as current control or armature voltage control.

The motor 15 applied motor torque to the coupling shaft 12 so as to obtain resultant force by adding its assist force to the operating force in the select operation, so that the resultant force moves the first and second control cables 8 and 18, the select lever 2, and the mode shift unit 300 to shift the operation modes of the automatic transmission 19.

In the select device 100, when the operating position select unit 100 fails electrically because of a broken electric wire for example, the operating force of the select lever 2 is directly transmitted from the lever 2 to the mode shift unit 300 mechanically through the first and second control cables 8 and 18, the input and output levers 10 and 13 and the others, thereby enabling the mode shift unit 300 to shift the modes of the automatic transmission 19 although its operating force becomes larger than in a normal state.

Figure 5:
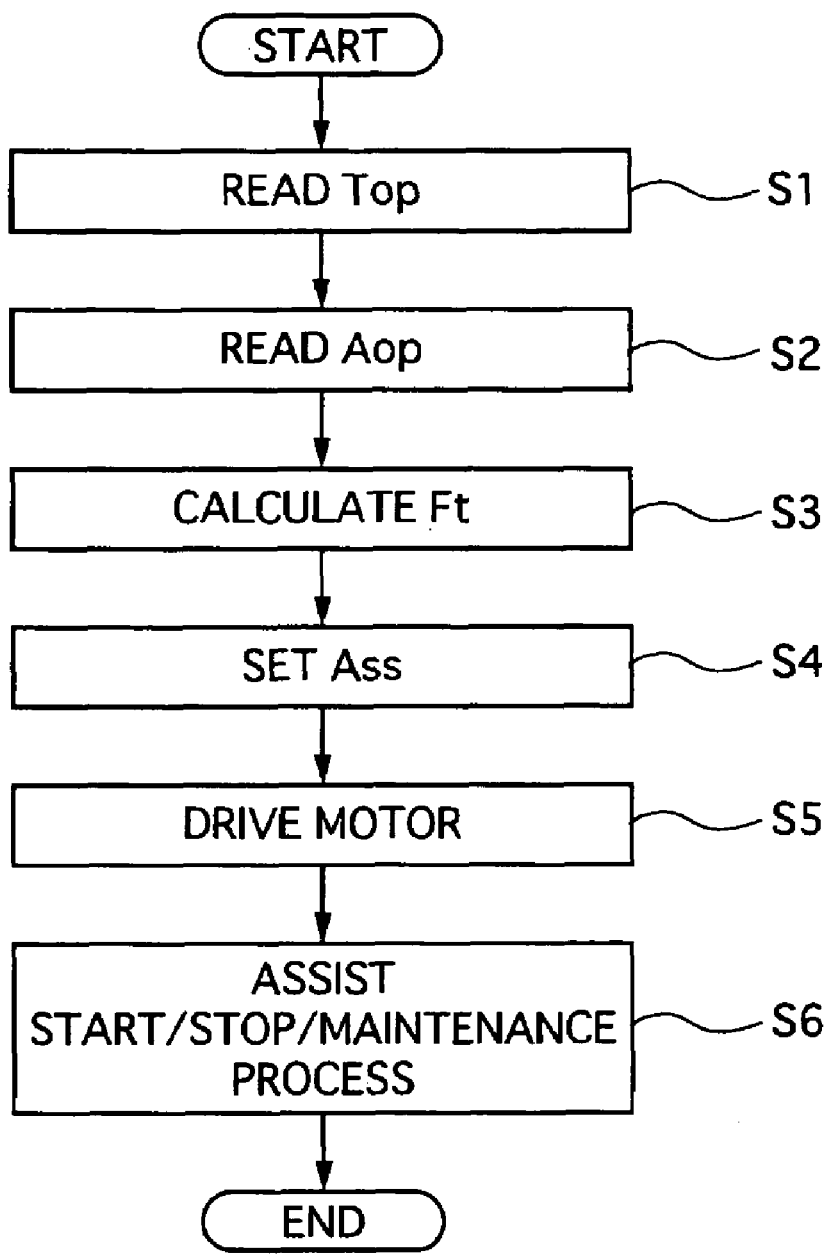
FIG. 5 is a flowchart of an assist process of a select lever operation executed in the control unit for controlling the assist actuator during select operation.

FIG. 5 shows a flowchart of an assist process executed in the control unit 22 to control the assist actuator 9 when the select lever 2 is operated by the driver.

At step S1, the control unit 22 receives an operating torque signal from the torque sensor 21 to read operating force F applied to the select lever 2, and then the flow goes to step S2.

At the step S2, the control unit 22 receives an operating angle signal from the operating angle sensor 200 to read an operating angle $A_{OP}$ of the select lever 2, and then the flow goes to step S3.

At the step S3, the target reaction setting force part 34 calculates and sets a target reaction force Ft based on the operating angle signal obtained from the operating angle sensor 200, and then the flow goes to step 4.

At the step S4, the adder 36 and the FB control part 37 set assist force Ass based on difference between the operating torque obtained from the torque sensor 21 and target torque proportional to the target force Ft obtained at the step S3, and then the flow goes to step S5.

At the step S5, the motor drive control part 38 is controlled to supply the electric power to the motor 15 to rote and produce the assist force, and then the flow goes to step S6.

At the step S6, an assist start/stop/maintenance process is performed, and the assist control is ended.

Figure 6:
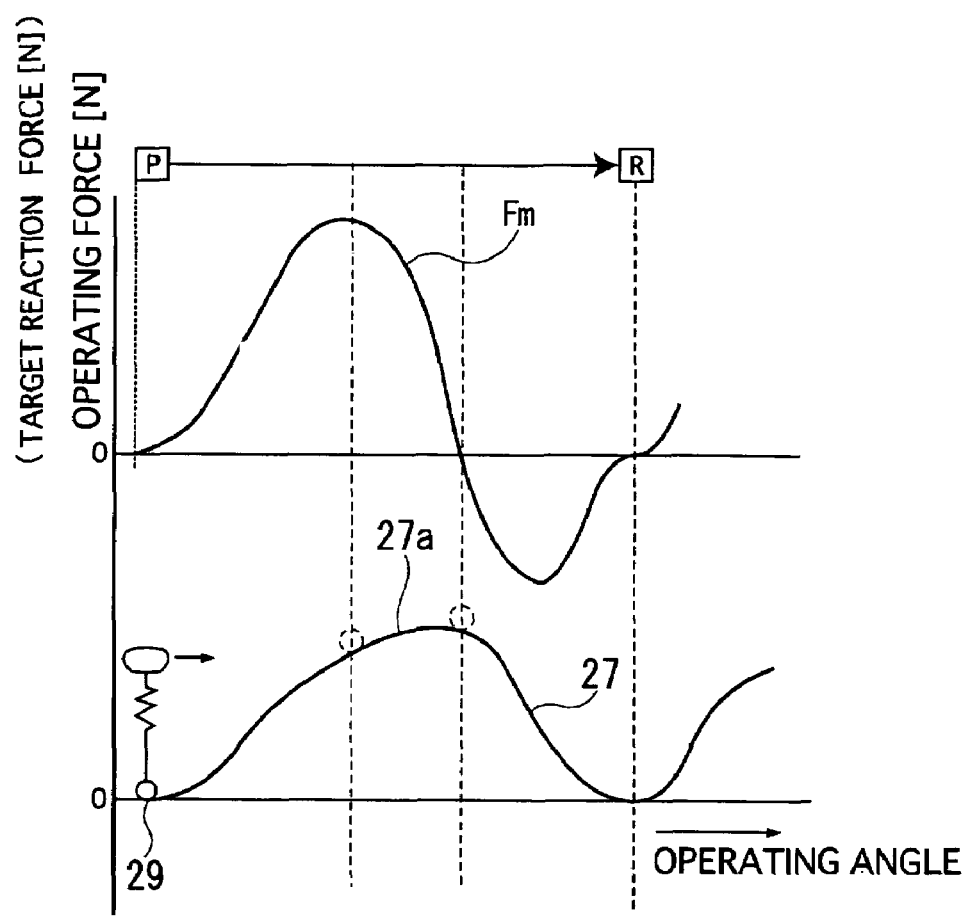
FIG. 6 is a schematic diagram showing relationships of reaction force acting on the select lever, and a cam profile of a detent mechanism with respect to an operating angle of the select lever when the select lever is shifted from P position to R position.

FIG. 6 shows characteristic relationships of the reaction force Fm acting on the knob 4, and a cam profile with respect to the operating angle $A_{OP}$ during the select operation from the P position to the R position without driving the motor 15. The reaction force Fm [N] is calculated based on an operating torque generated at the coupling shaft 12 of the assist actuator 9 and detected by the torque sensor 21. In order to shift the mode operation positions, manual force larger than the reaction force Fm is needed.

The reaction force Fm is generated by resultant force from the sum of friction force caused by the first and second cables 8 and 18, inertia force of the motor 15, spring force of the detent mechanism 350 and others. This reaction force Fm increases in a direction opposite to the operating direction of the lever 2 with the operating angle $A_{OP}$ to have its peak portion before the detent pin 29 gets over the top portion 27a of the cam 270, and then decreases with increasing the angle $A_{OP}$.

After the pin 29 passes over the top portion 27a, the reaction force Fm acts on the select lever 2 in the operating direction so as to move it to the bottom portion 27b of the R position because the spring plate 28 applies its spring force through the detent pin 29 to the cam 270 to rotate, with pulling the select lever 2 into the bottom portion 27b of the R position. This denotes that the operating force applied to the select lever 2 needs to be larger than the reaction force Fm in order to manually move the select lever 2 for the select operation when the motor 15 is not driven.

In the select operation, the detent pin 29 moves forward and backward together with the movement of the lever 2, providing the lever 2 with the reaction force in the operating direction or its opposite direction.

The reaction force Fm acts on the select lever 2 against the operating force until the detent pin 29 reaches the peak of the cam 270 because the detent plate 27 united with the manual plate lever 300 is biased by the spring force of the spring plate 28 in a direction opposite to the operating direction. In this operation zone, the operating force for moving the select lever 2 in the operating direction needs to overcome the reaction force produced by the spring force of the spring plate 28, and the lever 2 moves with increasing the amount of deformation of the spring plate 28. This results in increasing the reaction force acting on the lever 2.

When the detent pin 29 is on the peak, the reaction force in the operating direction and its opposite direction becomes zero, and the spring plate 28 is deformed to the maximum degree.

After the detent pin 29 passes over the peak until it reaches the bottom of the cam corresponding to the R position, the spring plate 28 starts to reduce its amount of deformation with applying the spring force to the detent plate 27, so that the detent plate 27 is pressed to rotate so that the lever 2 is assisted to move forward. In this operation zone, the reaction force Fm increases in the lever-assisting direction, and then decreases until the detent pin 29 reaches the bottom of the cam 270 corresponding the R position.

Figure 7:
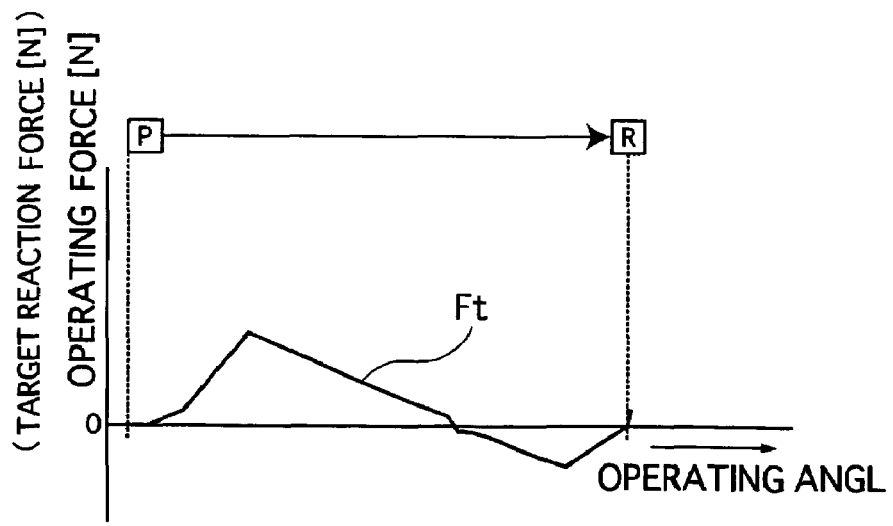
FIG. 7 is a schematic diagram showing a relationship between a desirable operating force of the select lever when the select lever is shifted from P position to R position.

FIG. 7 shows a characteristic relationship between a target reaction force to act on the knob 4 of the select lever 2 and an operating angle of the select lever 2. The target reaction force Ft [N] is set in advance so that a driver can obtain high select operating performance. In this embodiment, the assist control is performed so that an operating force of a driver becomes equal to or close to the target reaction force Ft, and thereby it can ensure high robust performance.

The assist control is performed by allowing for an ignition switch signal. In order to stop the engine, the ignition switch is turned to OFF. When the ignition switch is OFF, all the electric power is not supplied except a part of on-board devices in a conventional motor vehicle, which causes the assist control to be stopped. This results in a heavy operation of the select lever 2 to move to the P position, which is only one position where an ignition key can be taken out of an instrument panel in a motor vehicle with a safety select lever device.

In order to avoid the above problem, the operating position select device 100 of the first embodiment is provided with the assist maintenance part 41, the timer 42, and the power controller 43.

Figure 8:
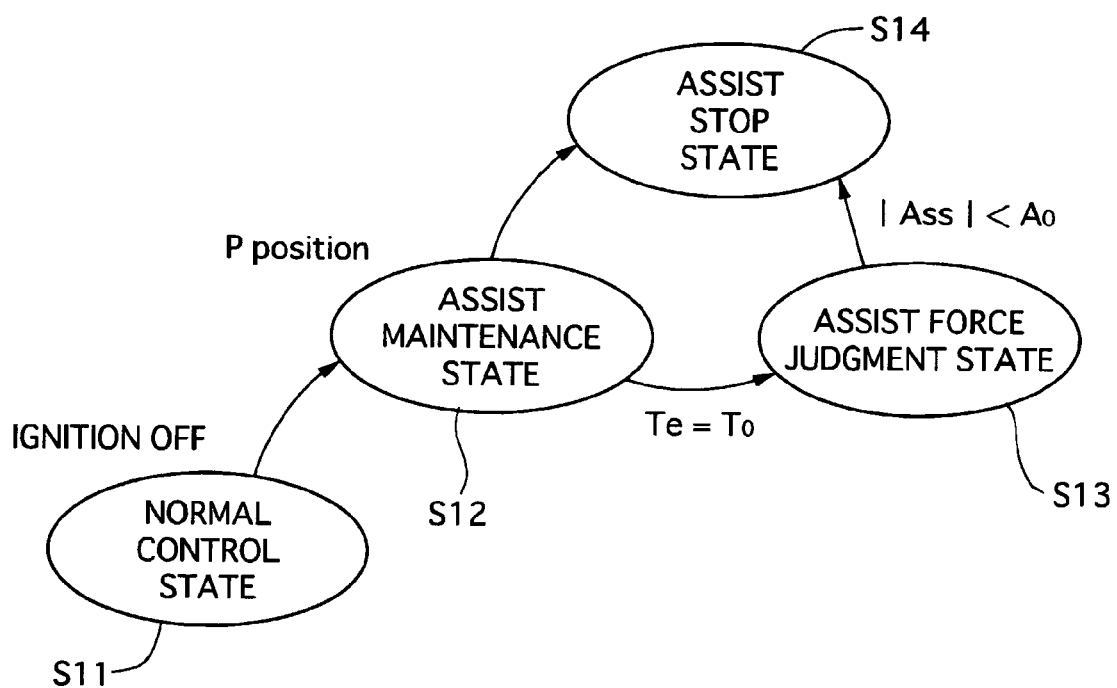
FIG. 8 is a flow chart showing change states of an assist maintenance process executed in the control unit and a power controller of the operating position select device shown in FIG. 1.

FIG. 8 shows a flow chart of change states of the assist maintenance control process executed in the control unit 22 and power controller 43.

In a normal control state S11, normal assist control is performed when the ignition switch 210 is kept ON. When the ignition switch 210 is turned to OFF, the normal control state S11 shifts to an assist maintenance state S12.

In the assist maintenance state S12, the assist control is performed. The assist maintenance state S12 shifts to an assist stop state S14 when the select lever 2 is located in the P position, while the assist maintenance state S12 shifts to an assist force judgment state S13 when the select lever 2 is not located in the P position and an elapse time Te from the beginning of the assist maintenance control reaches predetermined time $T_0$ for defining the predetermined period.

In the assist force judgment state S13, the assist maintenance part 46 judges whether or not the assist force |Ass| is smaller than a predetermined $A_0$. If the judgment is YES, the assist force judgment state S13 shifts to the assist stop state S14, while if NO, the judgment is repeated.

The assist maintenance control and the assist stop control will be described in detail.

In a case that a driver operates the select lever 2 to move toward the P position after the driver notices that the ignition switch is turned to OFF but the select lever 2 is not located in the P position, the power controller 43 detects the ignition switch 210 to be turned to OFF and shifts the ignition power line to the battery power line to maintain the assist control despite of the ignition switch signal OFF.

At a time, the assist maintenance part 41 starts the timer 42 to count elapse time when it receives the ignition switch signal OFF.

The assist control is maintained for a predetermined period after the ignition switch 210 is turned to OFF, which can bring the driver to easily shift the select lever 2 to the P position with the assist force in the predetermined period. When the select lever 2 is located in the P position in the predetermined period, the assist maintenance part 41 outputs an assist stop signal to the power controller 43 and the power controller 43 shifts to stop supplying the electric power, thereby stopping the assist control. When the select lever 2 is already located in the P position before the assist maintenance control starts, the assist maintenance control is canceled. These stopping or canceling of the assist maintenance control can bring the operating position select device 100 reduction of electricity consumption of no use.

In a case that the select lever 2 is pressed without driver's will, for example when the select lever 2 is hooked by a thing such as a bag, the assist force is applied based on torque inputted by the thing for the predetermined period after the ignition switch is turned to OFF. This torque is not so large as to change the mode positions and no further force or load is applied to the select lever 2. Accordingly, the assist control is stopped after the predetermined period passes. This prevents abnormal electricity consumption by hooking a thing at the select lever 2.

In a case that a driver operates the select lever 2 after the determined period, the assist maintenance part 41 detects an assist control signal outputted from the FB control part 37 and judges that the select lever 2 is being shifted. Then, the assist maintenance part 41 maintains the assist control until an assist control amount outputted from the FB control part 37 becomes equal to or smaller than a predetermined control amount. This can ensure easy operation and a nice select feeling until its select operation is ended.

In a case that the select lever 2 is operated in a direction where the lever 2 moves away from the P position during the predetermined period, the compensation gain setting part 40 changes the gain Ka from the gain used in the normal assist control so that the gain Ka brings the operating force of the lever 2 to be equal to or close to the resistance force generated by the detent mechanism 350. Therefore, the gain Ka is changed so that the assist force is suppressed to become smaller, which promotes the driver to operate the select lever 2 to the P position by providing a heavy select operation feeling to the driver.

The operating position select device 100 of the first embodiment has many advantages described below.

The select lever 2 can be shorter than a conventional one by about 150 mm at its portion projecting from a center console toward a passenger compartment without increasing an operating force applied to the select lever 2 so much. This brings a design freedom concerning an installation location of the select lever and/or a layout of a passenger compartment to be broadened.

When operating the select lever 2, assist torque from the electric motor 15 is applied to the coupling shaft 12 of the mechanically connecting mechanism so as to reduce the operating force applied to the select lever 2. When the operating position select unit 100 fails electrically, a driver can shift the mode shift unit 300 by operating the select lever 2 because the select lever 2 and the mode shift unit 300 are mechanically connected by the mechanically connecting mechanism, such as the first and second control cables 8 and 18 and the others.

The operating position select lever device 100 has the assist maintenance part 41, the timer 42, and the power controller 43, they can supply the electric power for the predetermined period after the ignition switch 210 is turned to OFF. This enables the driver to easily shift the select lever 2 to the P position with being assisted by the assist force after the ignition switch signal OFF when take-out of the ignition key or key-lock is impossible because the driver forgets to move the lever 2 to the P position.

The assist maintenance control is stopped after the predetermined period, which can save the electricity consumption of no use even when a thing is hooked at the lever 2. When the assist maintenance part 41 detects the select lever 2 to be in the P position during the assist maintenance control, it stops the assist maintenance control, which can improve the electricity consumption without uncomfortable select operation feeling.

When the assist maintenance part 41 detects based on the control amount outputted from the FB control part 37 that the select lever 2 is being operated after the predetermined period, it maintains the assist maintenance control until the control amount becomes equal to or smaller than the predetermined control amount, which can ensure the driver a nice select operation feeling.

When the select lever 2 is detected an select operation to move away from the P position by the operating direction judgment part 39 during the predetermined period, the assist force is reduced to be smaller or zero by using the compensation gain setting part 41 and the multiplier 35, which can promote the driver to operate the select lever 2 toward the P position, ending the assist control and improving the electricity consumption.

An operating position select device for an automatic transmission of a second embodiment according to the present invention will be described with reference to the accompanying drawings of FIGS. 9 and 10.

Figure 9:
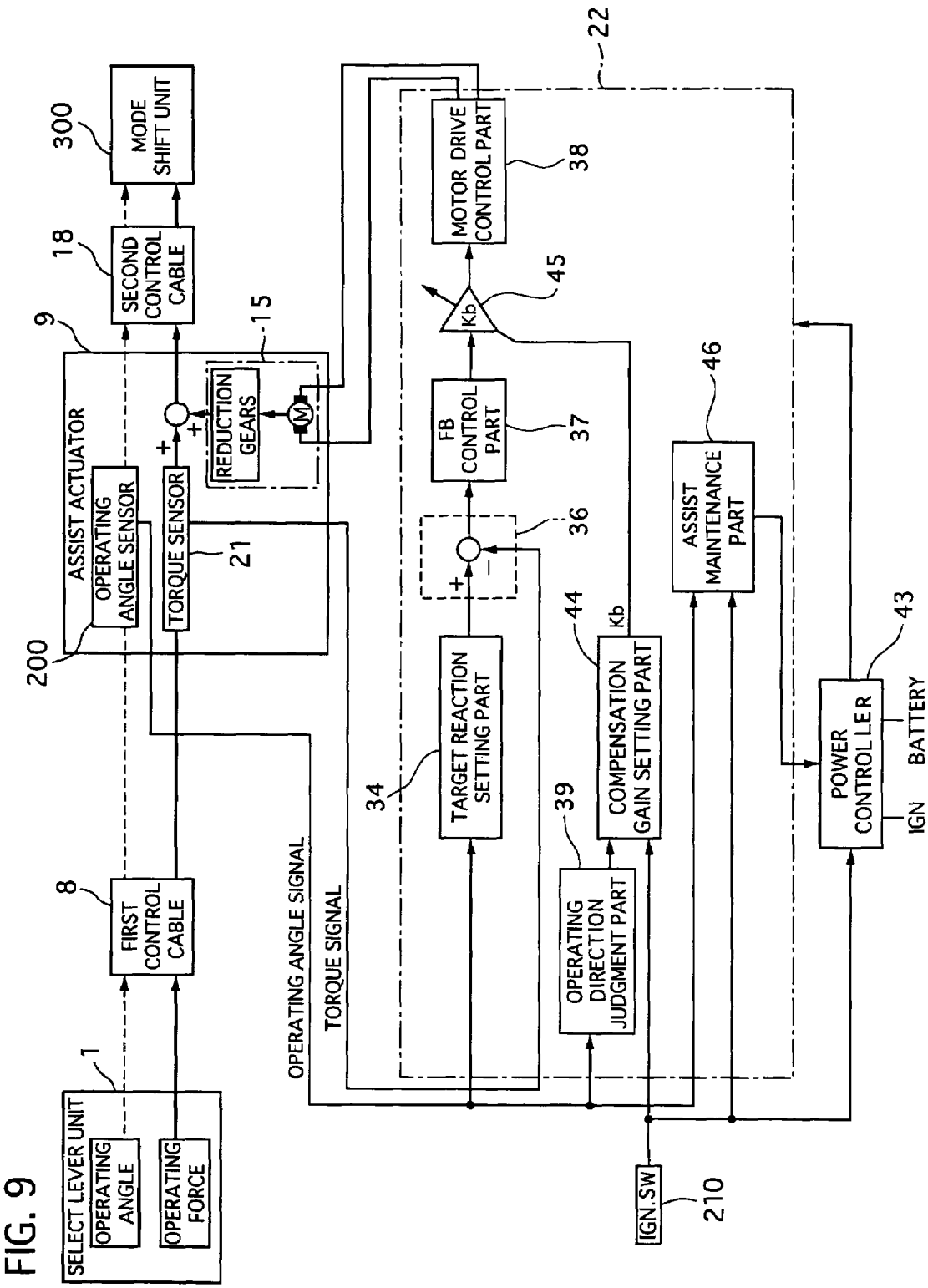
FIG. 9 is a control bock diagram of a control unit and its peripheral equipment that are used in an operating position select device of a second embodiment according to the present invention.

FIG. 9 shows a control block diagram of a control unit 22 and its peripheral units of the operating position select device of the second embodiment.

The control unit 22 includes an assistance maintenance part 46, a compensation gain setting part 44, and a multiplier 45.

The assist maintenance part 46 maintains assist control until a select lever is located in a P position after it detects an ignition switch signal OFF, and outputs a signal to end the assist control to a power controller 43 when the lever is located in the P position. The assist maintenance part 46 stops the assist control when it detects that the select lever is located in the P position. The assist maintenance part 46 also acts as an assist stop part of the present invention.

The compensation gain setting part 44 compensates and sets a gain Kb so as to prohibit output of assist force when it receives the ignition switch signal OFF and a select operation of the select lever moving away from the P position.

The multiplier 45 multiplies the gain Kb by an assist control amount and outputs its result to a motor drive control part 38.

The other parts of the operating position select device and an automatic transmission are constructed to be similar to those of the first embodiment shown in FIGS. 1 to 4.

Figure 10:
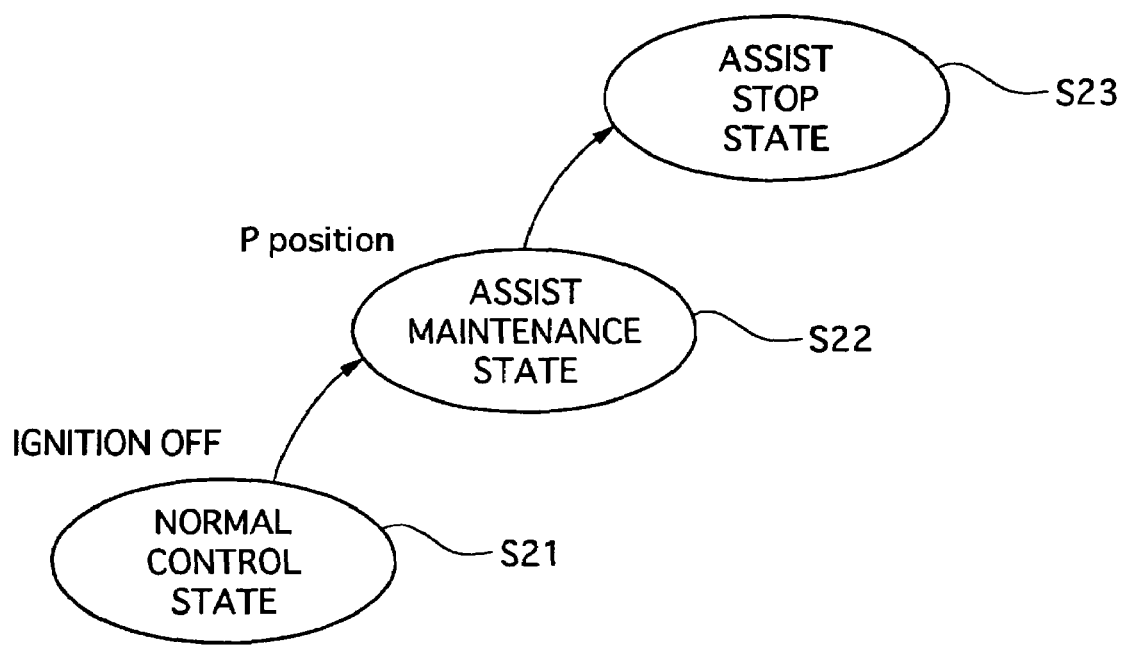
FIG. 10 is a flow chart showing change states of an assist maintenance process executed in the control unit and a power controller of the operating position select device shown in FIG. 9.

FIG. 10 shows a flow chart of change states of the assist maintenance control process executed in the control unit 22 and power controller 43 shown in FIG. 9.

In a normal control state S21, normal assist control is performed when an ignition switch 210 is kept ON. When the ignition switch 210 is turned to OFF, the normal control state S11 shifts to an assist maintenance state S22.

In the assist maintenance state S22, the assist control is performed. The assist maintenance state S22 shifts to an assist stop state S23 when the select lever is located in the P position.

In the assist stop state S23, the assist control is stopped.

Accordingly, the assist maintenance part 46 does not output an assist stop signal to the power controller 43 by the time when the select lever is located in the P position, which ensures the assist control for assisting the driver to move the select lever to the P position.

The compensation gain Kb is set zero so as not to output the assist force when the select lever is operated to move away from the P position, which can promote a driver to operate the lever toward the P position.

The operating position select device of the second embodiment has the advantages similar to those of the first embodiment.

An operating position select device for an automatic transmission of a third embodiment according to the present invention will be described with reference to the accompanying drawings of FIGS. 11 and 12.

Figure 11:
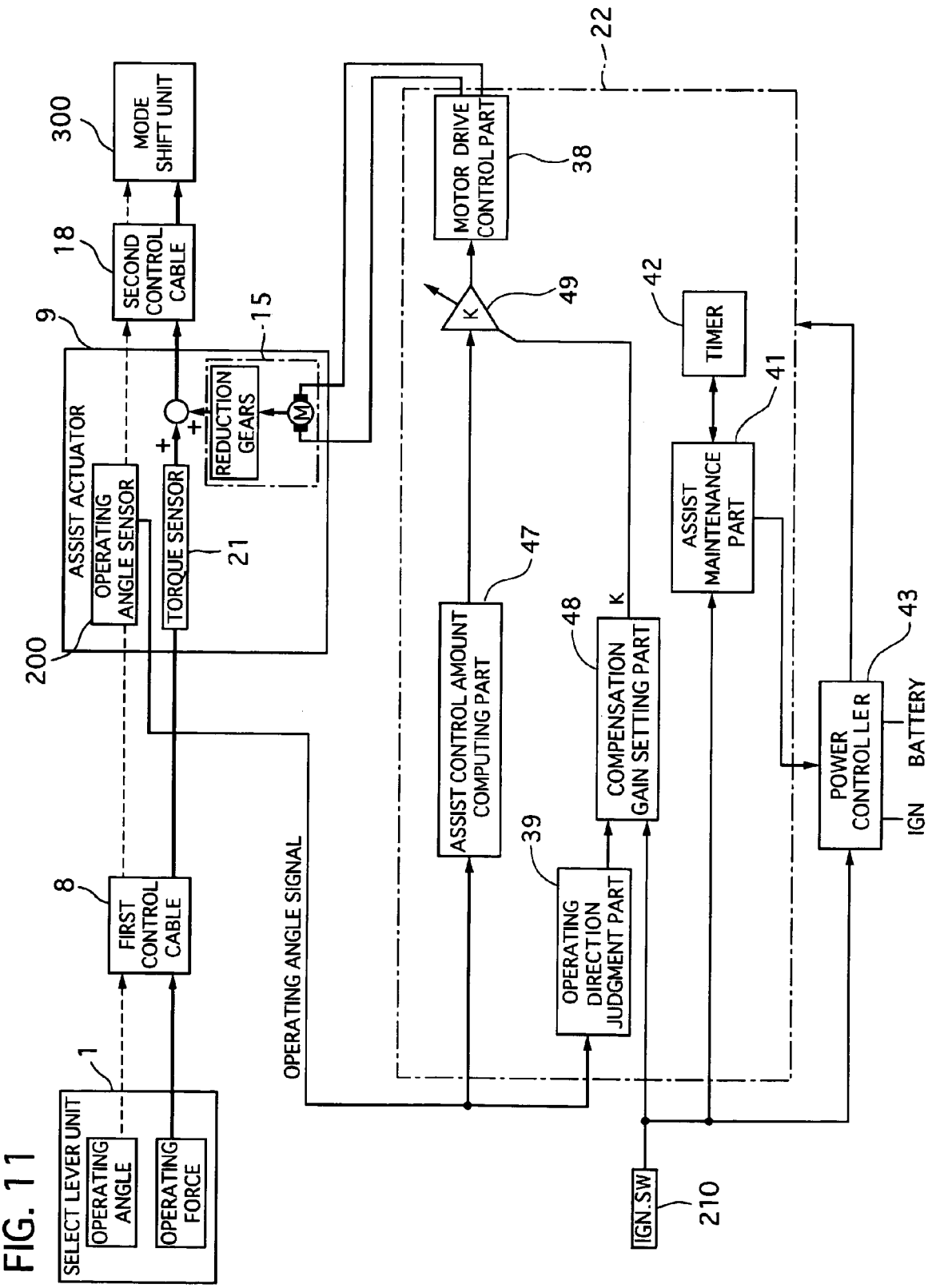
FIG. 11 is a control bock diagram of a control unit and its peripheral equipment that are used in an operating position select device of a third embodiment according to the present invention.

FIG. 11 shows a control block diagram of a control unit 22 and its peripheral units of the operating position select device of the third embodiment.

The control unit 22 includes an assist control amount computing part 47, a compensation gain setting part 48, and a multiplier 49.

The assist control amount computing part 47 computes an assist control amount directly based on an operating angle detected by an operating angle sensor 200.

The compensation gain setting part 48 compensates and sets a gain K so as to prohibit output of assist force when it receives an ignition switch signal OFF and a select operation of the select lever moving away from the P position.

A multiplier 45 multiplies the gain K by the assist control amount and outputs its result to a motor drive control part 38.

The other parts of the operating position select device and an automatic transmission are constructed to be similar to those of the first embodiment shown in FIGS. 1 to 4.

Figure 12:
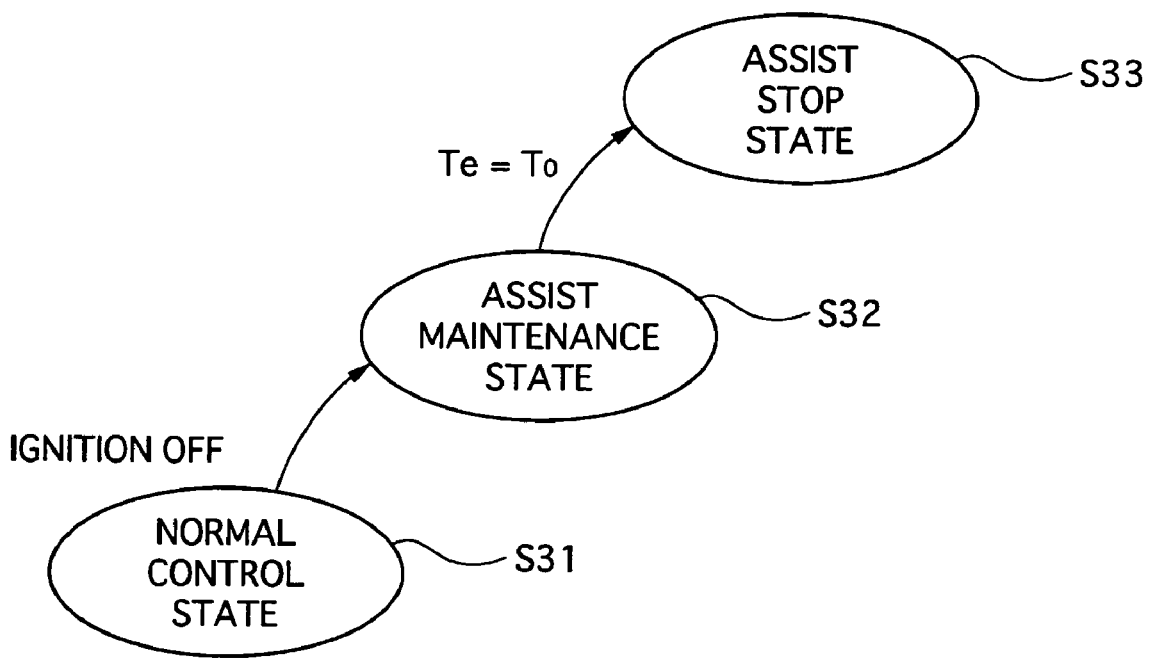
FIG. 12 is a flow chart showing change states of an assist maintenance process executed in the control unit and a power controller of the operating position select device shown in FIG. 11.

FIG. 12 shows a flow chart of change states of the assist maintenance control process executed in the control unit 22 and power controller 43 shown in FIG. 11.

In a normal control state S31, normal assist control is performed when an ignition switch 210 is kept ON. When the ignition switch 210 is turned to OFF, the normal control state S11 shifts to an assist maintenance state S32.

In the assist maintenance state S32, the assist control is performed. The assist maintenance state S32 shifts to an assist stop state S33 when count time Te after an ignition switch signal OFF passes away and becomes a predetermined time $T_0$.

In the assist stop state S33, the gain K is set to zero, and accordingly the assist control is stopped.

The operating position select device of the third embodiment has the advantages similar to those of the first embodiment.

An operating position select device for an automatic transmission of a forth embodiment according to the present invention will be described with reference to the accompanying drawings of FIGS. 13 and 14.

Figure 13:
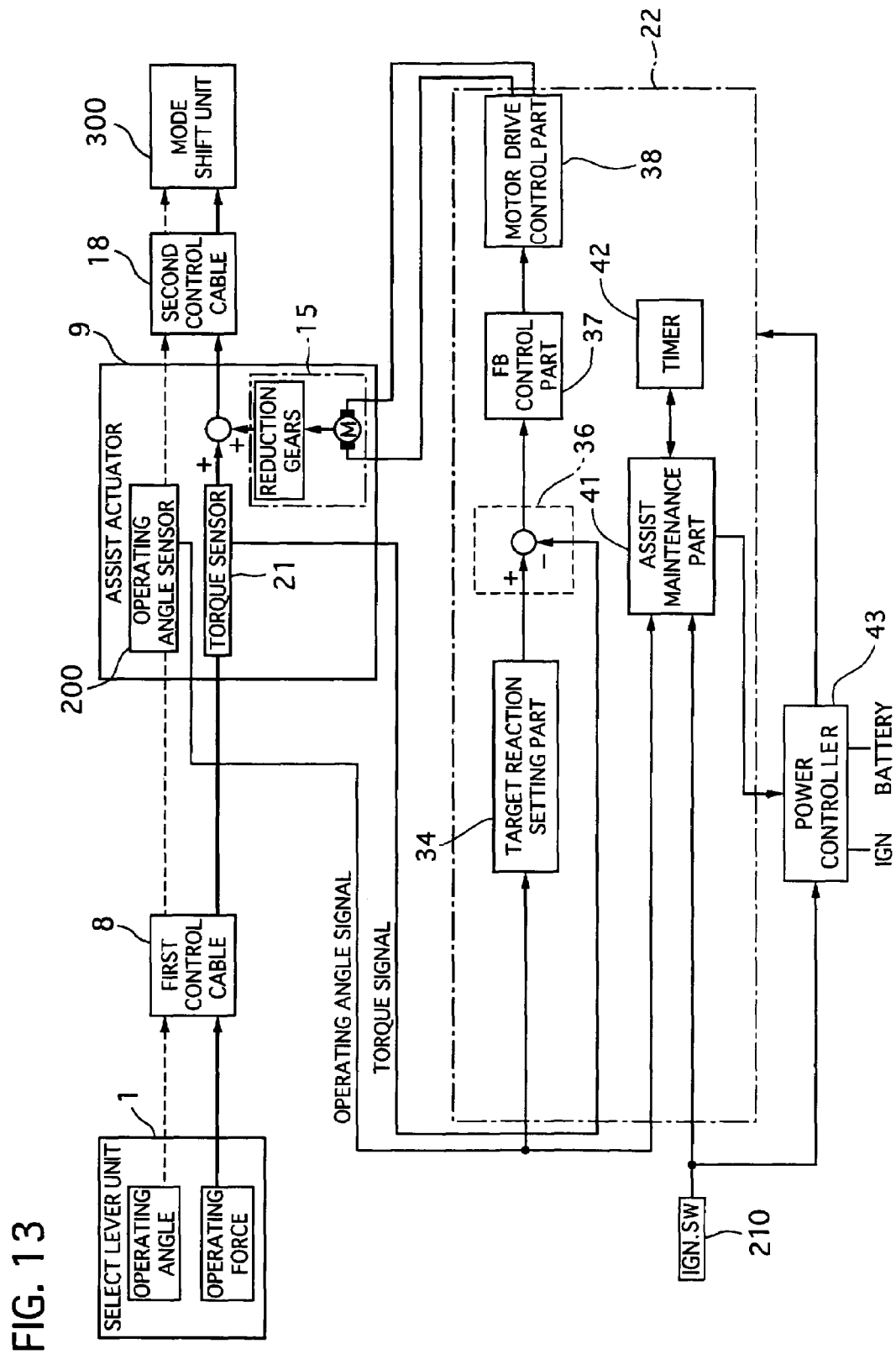
FIG. 13 is a control bock diagram of a control unit and its peripheral equipment that are used in an operating position select device of a forth embodiment according to the present invention.

FIG. 13 shows a control block diagram of a control unit 22 and its peripheral units of the operating position select device of the third embodiment.

An assist maintenance part 41 maintains assist control after an ignition switch 210 is turned to OFF and stops the assist control when a timer 42 counts elapse time to be a predetermined time or a select lever is located in a P position. The other parts of the operating position select device is similar to those of the first embodiment except that the control unit 22 of this embodiment does not have the operating judgment part 39 control unit 22, the compensation gain setting part 41, and the multiplier 35 of the first embodiment shown in FIG. 4.

Figure 14:
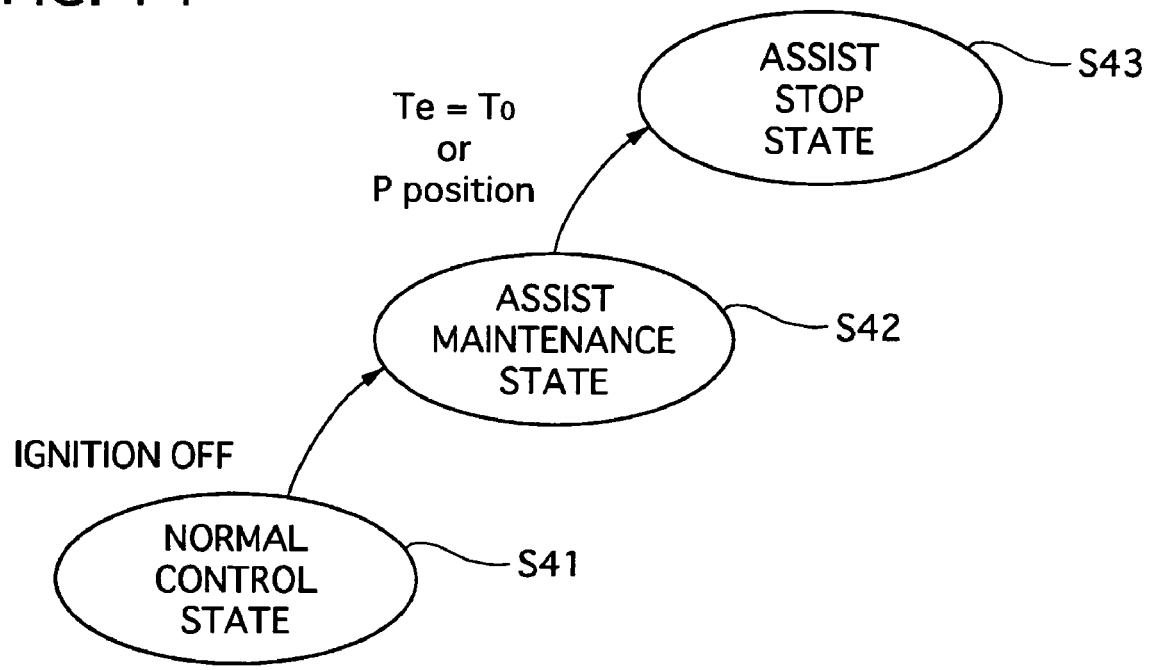
FIG. 14 is a flow chart showing change states of an assist maintenance process executed in the control unit and a power controller of the operating position select device shown in FIG. 13.

FIG. 14 show a flow chart of change states of the assist maintenance control process executed in the control unit 22 and power controller 43 shown in FIG. 13.

In a normal control state 41, normal assist control is performed when the ignition switch 210 is kept ON. When the ignition switch 210 is turned to OFF, the normal control state S11 shifts to an assist maintenance state S42.

In the assist maintenance state S42, the assist control is performed. The assist maintenance state S42 shifts to an assist stop state S43 when count time Te after an ignition switch signal OFF passes away and becomes a predetermined time $T_0$ or the select lever is located in the P position.

In the assist stop state S43, the assist control is stopped.

The operating position select device of the forth embodiment has the advantages similar to those of the first embodiment.

While there have been particularly shown and described with reference to preferred embodiments thereof, it will be understood that various modifications may be made therein, and it is intended to cover in the appended claims all such modifications as fall within the true spirit and scope of the invention.

For example, the select lever may have a configuration different from that of the first embodiment shown in FIG. 1, for example, a finger-controable one.

The mechanically connecting mechanism may be rods or linkage instead of the first and second control cables 8 and 18 in the above embodiments. The select lever may be of a shape different from the above embodiments.

The configuration of the cam of the detent mechanism may be formed arbitrarily to have different target reaction force.

The operating torque or the operating force may be detected based on an estimate from supply current to the motor 15 and its rotational speed in stead of using the torque sensor 21.

The operating position can be detected by the displacement amount of the select lever 2 or the mechanically connecting mechanism 400 that connects the select lever 2 and the mode shift unit 300 with each other instead of the operating angle of the shift lever 2.

The assist force produced by the electric motor 15 can be controlled based on only the operating angle, or on the operating angle and the operating torque.

The entire contents of Japanese Patent Application No. 2004-032547 filed Feb. 9, 2004 is incorporated herein by reference.

What is claimed is:

1. An operating position select device for an automatic transmission whose operation modes are shiftable, the operating position select device comprising:
   a select lever unit having a select lever that is operated by a driver between a plurality of select positions corresponding to the operation modes;
   an operating state sensor that detects an operating state of the select lever and outputs an operating state signal;
   a mode shift unit mounted on the automatic transmission to shift operation modes of the automatic transmission;
   a mechanically connecting means that mechanically connects the select lever and said mode shift unit with each other;
   an assist actuator that is arranged between the select lever and said mode shift unit and supplies assist force to the shift lever; and
   a control unit for executing assist control to control said assist actuator based on the operating state signal, and said control unit having an assist maintenance part for maintaining the assist control for a predetermined period after an ignition switch signal of an ignition switch of an engine becomes OFF.

2. An operating position select device for an automatic transmission according to claim 1, wherein
   said control unit includes an assist stop control part for stopping the assist control when said control unit detects based on the operating state signal that the select lever is located in a P position during execution of the assist control after the ignition switch signal OFF.

3. An operating position select device for an automatic transmission according to claim 2, wherein
   the assist maintenance part maintains the assist control until an assist control amount for driving said assist actuator becomes at most a predetermined amount in a case that the assist amount is outputted to produce the assist force after the predetermined period elapses.

4. An operating position select device for an automatic transmission according to claim 3, wherein
   said control unit includes an assist suppression part to decease the assist force acting in a direction where the select lever is assisted to move away from the P position.

5. An operating position select device for an automatic transmission according to claim 4, wherein
   the assist force is reduced to zero.

6. An operating position select device for an automatic transmission according to claim 1, wherein
   the assist maintenance part maintains the assist control until an assist control amount for driving said assist actuator becomes at most a predetermined amount in a case that the assist amount is outputted to produce the assist force after the predetermined period elapses.

7. An operating position select device for an automatic transmission according to claim 6, wherein
   said control unit includes an assist suppression part to decease the assist force acting in a direction where the select lever is assisted to move away from the P position.

8. An operating position select device for an automatic transmission according to claim 7, wherein
   the assist force is reduced to zero.

9. An operating position select device for an automatic transmission according to claim 1, wherein
   said control unit includes an assist suppression part to decease the assist force acting in a direction where the select lever is assisted to move away from the P position.

10. An operating position select device for an automatic transmission according to claim 9, wherein
    the assist force is reduced to zero.

11. An operating position select device for an automatic transmission according to claim 1, wherein
    the predetermined period for the assist control performed by the assist maintenance part of said control unit is set to be a period from time when said ignition switch is turned to OFF to time when the select lever is located in a P position.

12. An operating position select device for an automatic transmission according to claim 11, wherein
    said control unit includes an assist suppression part to decease the assist force acting in a direction where the select lever is assisted to move away from the P position.

13. An operating position select device for an automatic transmission according to claim 12, wherein
    the assist force is reduced to zero.

* * * * *

UNITED STATES PATENT AND TRADEMARK OFFICE
CERTIFICATE OF CORRECTION

PATENT NO. : 7,243,567 B2  Page 1 of 1
APPLICATION NO. : 11/050795
DATED : July 17, 2007
INVENTOR(S) : Osamura et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 273 days Delete the phrase "by 273 days" and insert -- by 264 days--

Signed and Sealed this

Sixteenth Day of October, 2007

JON W. DUDAS
*Director of the United States Patent and Trademark Office*